United States Patent [19]
Chern

[11] Patent Number: 5,339,929
[45] Date of Patent: Aug. 23, 1994

[54] BRAKE ASSEMBLY FOR A BICYCLE

[76] Inventor: Tsoung Ren Chern, 58, Ma Yuan West St., Taichung, Taiwan

[21] Appl. No.: 86,650

[22] Filed: Jul. 2, 1993

[51] Int. Cl.⁵ ............................ B62L 1/06; B62L 3/00
[52] U.S. Cl. .................... 188/24.16; 74/89.22; 74/502.2
[58] Field of Search ............... 188/24.16, 2 D, 24.11; 74/502.2, 89.22, 110

[56] References Cited

U.S. PATENT DOCUMENTS

| | | | |
|---|---|---|---|
| 3,655,015 | 4/1972 | Mennesson | 188/2 D X |
| 4,480,720 | 11/1984 | Shimano | 188/24.16 X |
| 4,903,536 | 2/1990 | Salisbury, Jr. et al. | 74/89.22 |

FOREIGN PATENT DOCUMENTS 957019 2/1950 France ........................ 188/24.16

*Primary Examiner*—Robert J. Oberleitner
*Assistant Examiner*—Kevin D. Rutherford

[57] ABSTRACT

A brake for simultaneously braking two wheels of a bicycle includes a pair of braking mechanisms secured to the bicycle for braking the wheels respectively, a disc is rotatably secured to the bicycle, a handgrip is coupled to the disc by a cable for rotating the disc, and a pair of strings couple the brake mechanisms to the disc, the brake mechanisms are actuated to brake the wheels simultaneously when the disc is rotated by the handgrip.

4 Claims, 4 Drawing Sheets

BRAKE ASSEMBLY FOR A BICYCLE

BACKGROUND OF THE INVENTION

1. Field of the Invention

The present invention relates to a brake assembly, and more particularly to a brake assembly for a bicycle.

2. Description of the Prior Art

Typical brake assemblies of bicycles are provided to brake the front wheel and the rear wheel of the bicycle respectively and include two pairs of brake shoes coupled to the handgrips which are pivotally coupled to two end portions of the handle bar of the bicycle, it is to be noted that only one of the wheels can be braked when either of the handgrips is actuated. The two wheels can not be braked simultaneously.

The present invention has arisen to mitigate and/or obviate the afore-described disadvantages of the conventional brake assemblies of bicycles.

SUMMARY OF THE INVENTION

The primary objective of the present invention is to provide a brake assembly which can be used to brake both wheels of the bicycle simultaneously when only one of the handgrips is actuated.

In accordance with one aspect of the invention, there is provided a brake assembly for simultaneously braking two wheels of a bicycle comprising a pair of braking mechanisms secured to the bicycle for braking the wheels respectively, a first disc rotatably secured to the bicycle, means for rotating the first disc, and means coupling the brake mechanisms to the first disc, whereby, the brake mechanisms are actuated to brake the wheels simultaneously when the first disc is rotated.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
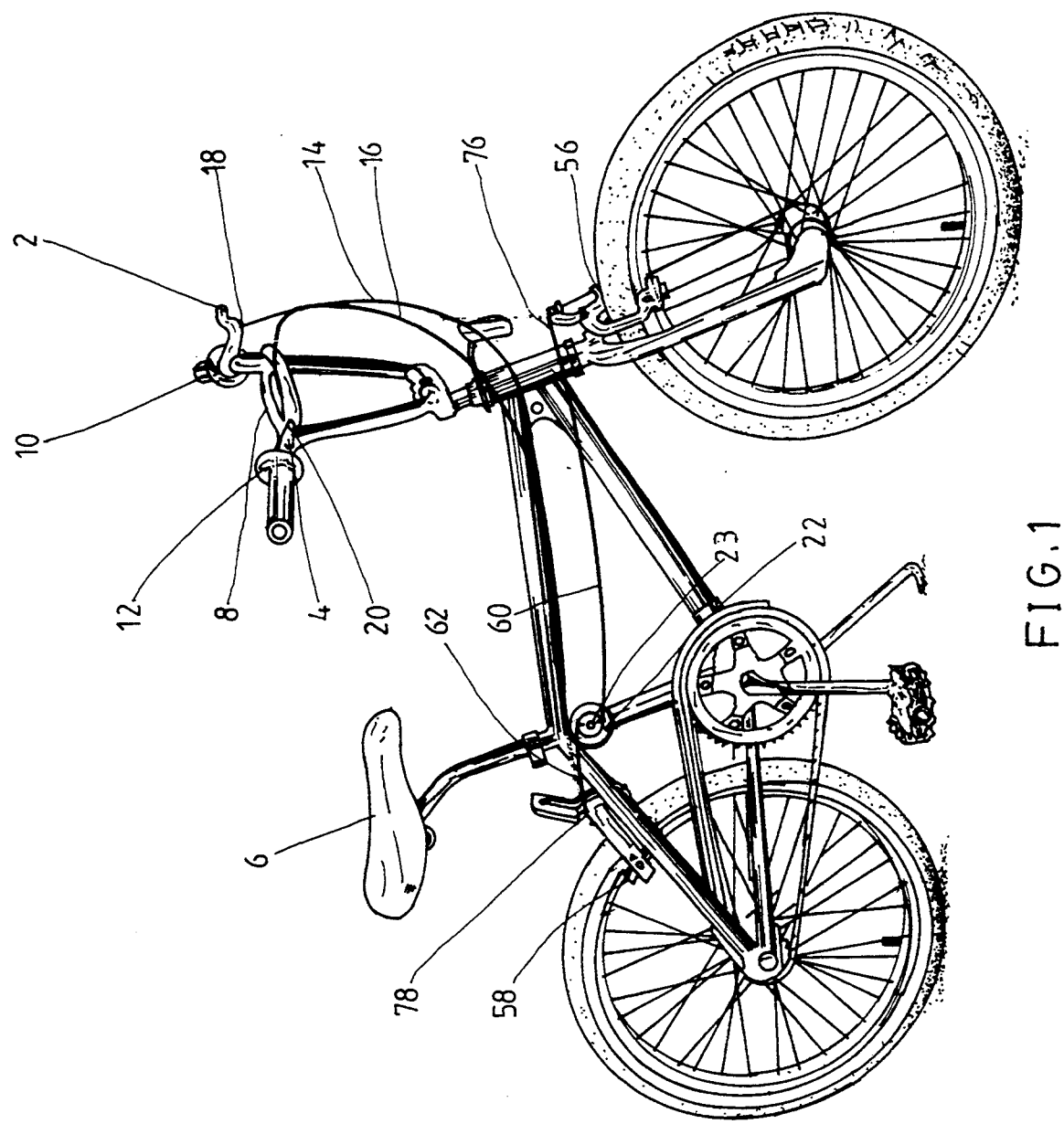
FIG. 1 is a perspective view of a bicycle having a brake assembly in accordance with the present invention.
Figure 2:
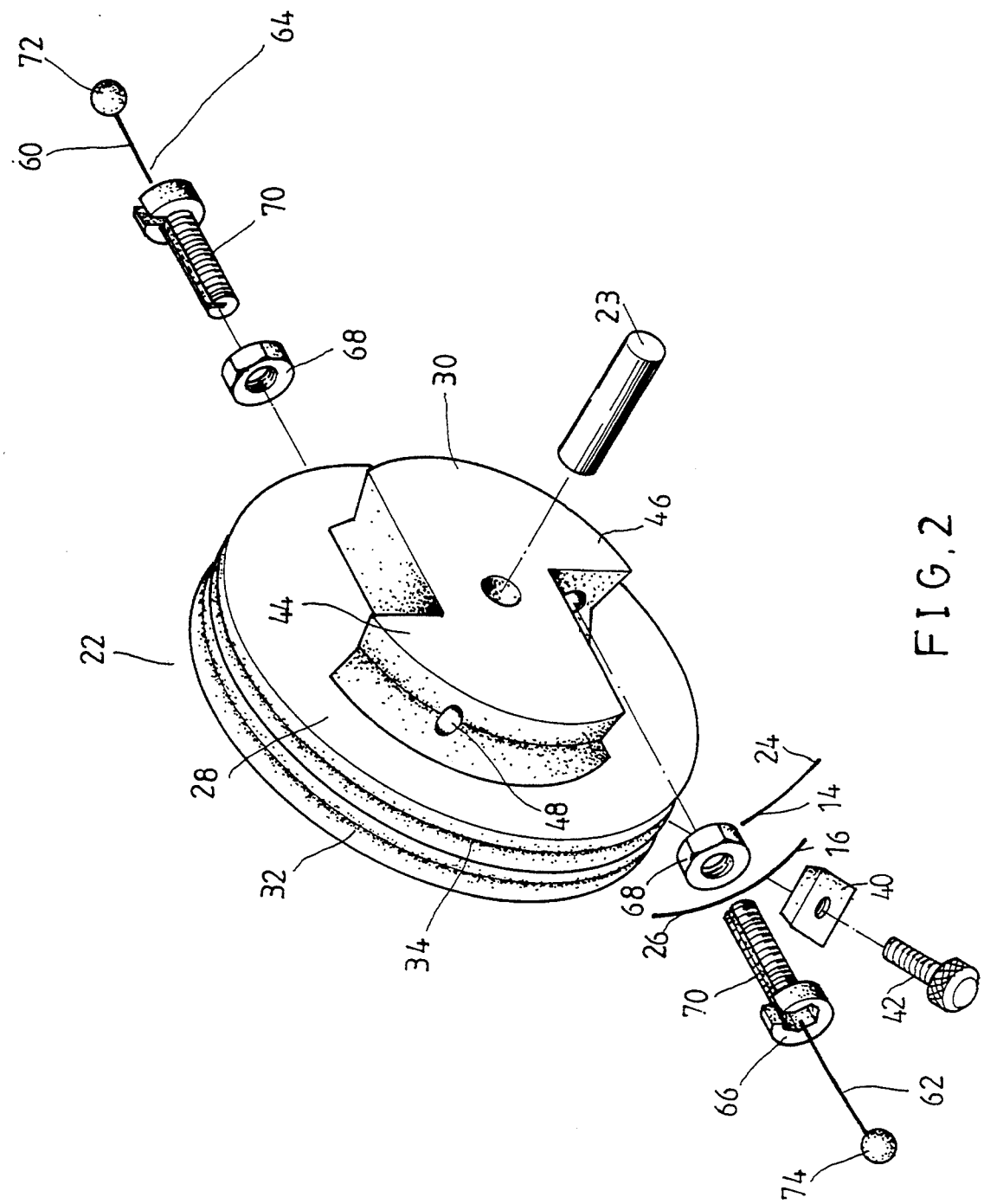
FIG. 2 is an exploded view of the brake assembly.
Figure 3:
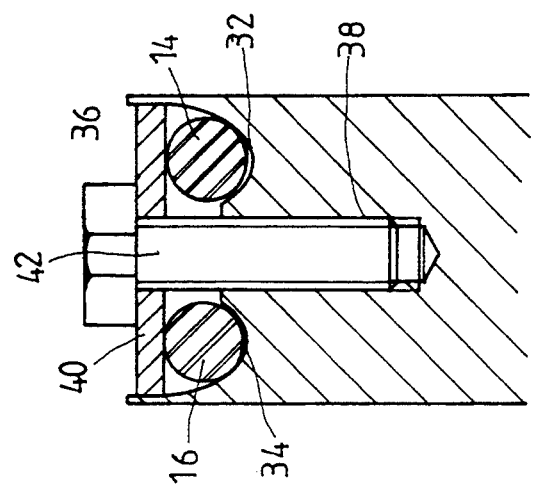
FIGS. 3 and 4 are partial cross sectional views illustrating part of the bicycle respectively.

Referring to the drawings, and initially to FIG. 1, a typical bicycle comprises two handgrips 2, 4 pivotally coupled to the end portions 10, 12 of the handlebar 8 respectively, two cables 14, 16 each including one end 18, 20 coupled to the handgrips 2, 4 respectively. As shown in FIG. 2, the brake assembly in accordance with the present invention comprises a disc 22 pivotally coupled to the seat post of the bicycle by a pivot axle 23, the disc 22 includes a body 28 having two annular recesses 32, 34 formed in the outer peripheral portion thereof, the other end portions 24, 26 of the cables 14, 16 are engaged in the recesses 32, 34 of the body 28, a screw hole 38 is formed in the body 28 close to the end portions 24, 26 of the cables 14, 16, a bolt 42 is threaded through a washer 40 and threaded into the screw hole 38 of the body 28 so as to fix the end portions 24, 26 of the cables 14, 16 to the body 28, best shown in FIG. 3.

The disc 22 further includes another disc 30 of smaller diameter firmly secured to the body 28, the disc 30 includes two notches oppositely formed therein so as to form two curved portions 44, 46 in which each of the curved portions 44, 46 includes an orifice 48, 50 formed therein.

Figure 4:
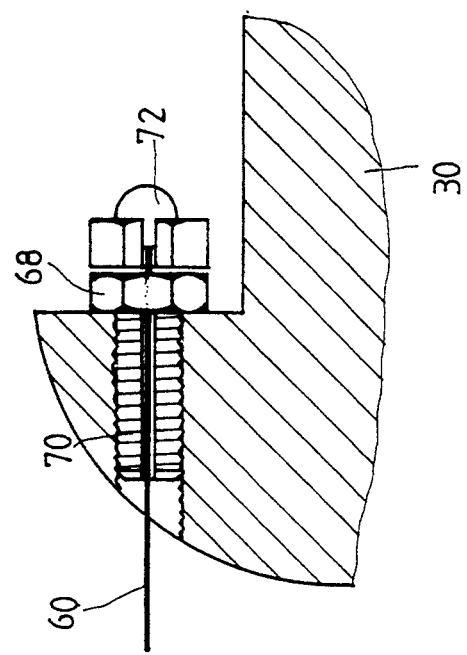

The brake assembly further includes two strings 60, 62 each having a head portion 72, 74 provided on one end thereof, the other ends of the strings 60, 62 each being threaded through a bolt 70 and coupled to the brake mechanisms 56, 58, the bolts 70 are threaded in the orifices 48, 50 respectively and a nut 68 is threaded on each of the bolts 70 for fixing the bolts 70 in place, best shown in FIG. 4. The bolts 70 may be threaded relative to the curved portions 44, 46 in order to adjust the tension of the strings 60, 62.

Figure 5:
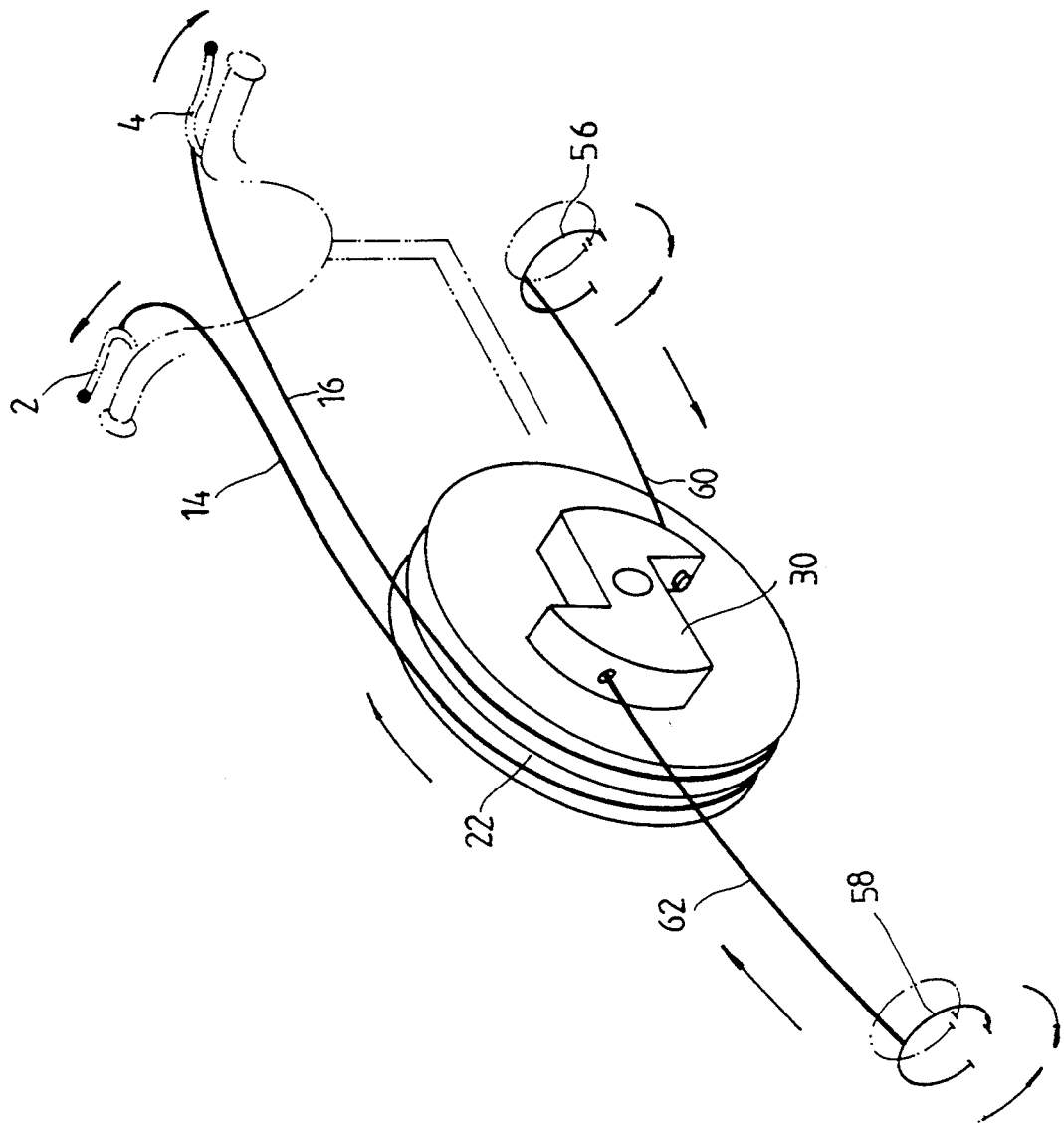
FIG. 5 is a schematic view illustrating the operation of the brake assembly.

In operation, as shown in FIGS. 1 and 5, when either of the handgrips 2, 4 is actuated or pulled toward the handlebar 8 of the bicycle, the body 28 of the disc 22 is rotated by either of the cables 14, 16, the strings 60, 62 are thus caused to be wound on the disc 30, whereby, the brake mechanisms 56, 58 can be actuated to brake the wheels simultaneously.

Accordingly, the two wheels of the bicycle can be simultaneously braked by the brake assembly in accordance with the present invention when only one of the handgrips is actuated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake assembly for simultaneously braking two wheels of a bicycle comprising a pair of braking mechanisms for securing to said bicycle for braking said wheels respectively, a first disc rotatably for securing to said bicycle, means for rotating said first disc, and means coupling said brake mechanisms to said first disc, said coupling means comprising a second disc secured to said first disc and including an outer peripheral portion, and a pair of strings each including a first end coupled to said brake mechanisms respectively and a second end secured to said outer peripheral portion of said second disc, said strings being wound on said second disc when said first disc is rotated, whereby, said brake mechanism are actuated to brake said wheels simultaneously when said first disc is rotated.

2. A brake assembly according to claim 1, wherein said first disc comprises an outer peripheral portion, said rotating means comprises at least one cable including a first end fixed to said outer peripheral portion of said first disc and including a second end, said brake assembly comprises at least one handgrip pivotally coupled to said bicycle, said second end of said cable is secured to said handgrip and arranged such that said first disc is rotated when said handgrip is actuated.

3. A brake assembly according to claim 2, wherein said first disc includes at least one annular recess formed in said outer peripheral portion thereof for engaging with said cable, a screw hole formed in said outer peripheral portion of said first disc, a bolt threaded into said screw hole for fixing said first end of said cable to said outer peripheral portion of said first disc.

4. A brake assembly according to claim 1, wherein said second disc includes two notches formed therein so as to form two curved portions in said second disc, an orifice formed in each of said curved portions, a bolt threaded in each of said orifices of said curved portions, said second end of each of said strings is threaded through the respective bolt and orifice and includes ahead portion engaged with said bolt such that said strings are secured to said outer peripheral portion of said second disc.

* * * * *